Oct. 5, 1954                H. V. TIMMINS                2,690,637
POWER LAWN MOWER DRIVING MECHANISM
Filed Sept. 15, 1950
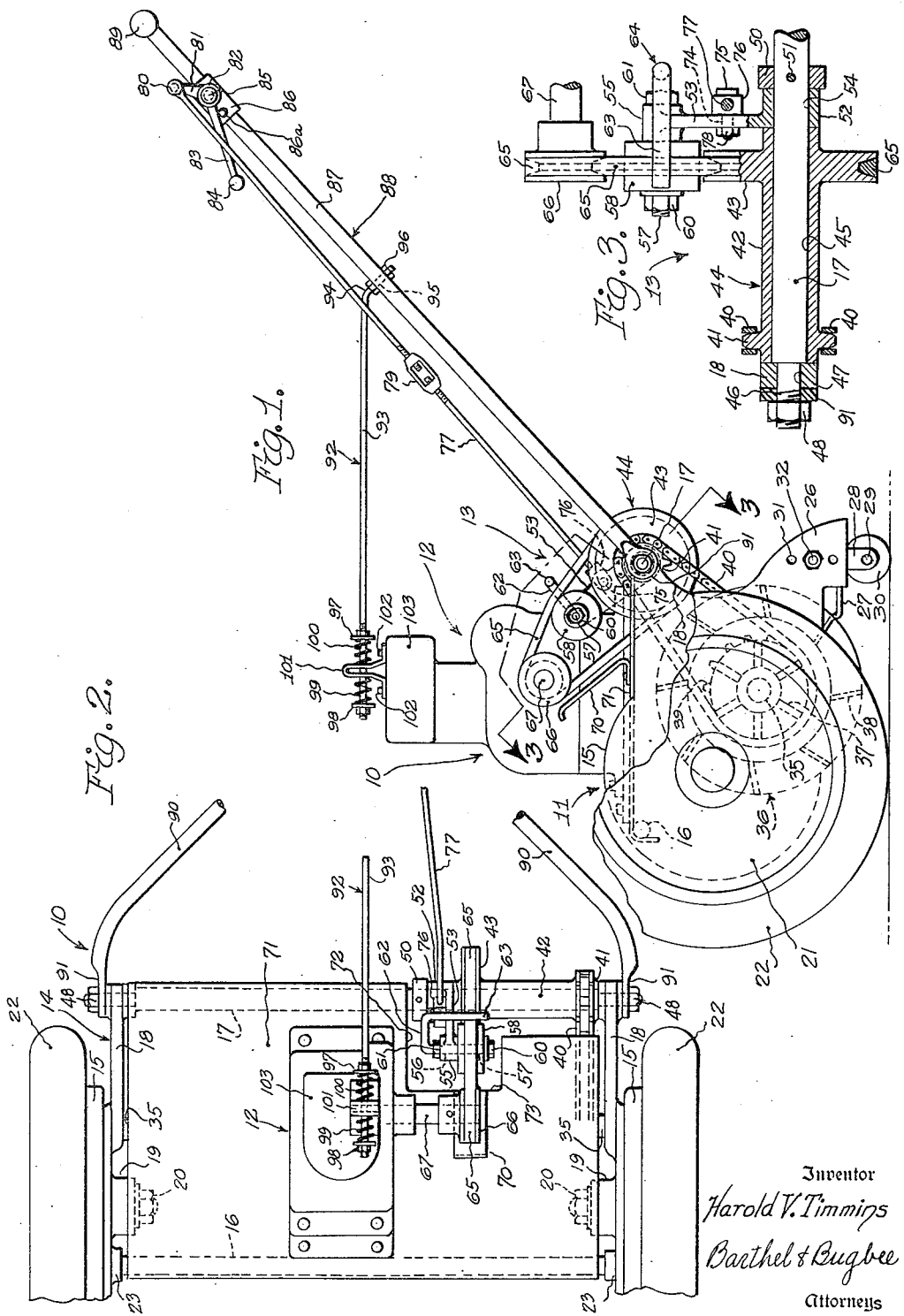
Inventor
Harold V. Timmins
Barthel & Bugbee
Attorneys Patented Oct. 5, 1954

2,690,637

UNITED STATES PATENT OFFICE 2,690,637

POWER LAWN MOWER DRIVING MECHANISM

Harold Vernon Timmins, Detroit, Mich., assignor to The Moto-Mower Company, Detroit, Mich., a corporation of Michigan Application September 15, 1950, Serial No. 185,061

1 Claim. (Cl. 56—26)

This invention relates to power lawnmowers and, in particular, to driving mechanism for power lawnmowers.

One object of this invention is to provide a power lawnmower driving mechanism which is mounted to swing upon the so-called shrub rod or one of the cross braces of the lawnmower frame in such a manner that the operating pivot of the belt tightener and the pivot axis of the handle are so close to one another as to have a substantially common pivot axis, with the result that the lawnmower handle, upon which the controls for the belt tightener are mounted, can be raised and lowered without loosening or tightening the belt tightener.

Another object is to provide a power lawnmower driving mechanism of the foregoing character, wherein the application of power to the driving wheel is made through a belt running between pulleys on the engine and shrub rod or cross brace of the lawnmower frame in such a manner that the belt tightener arm, by being pivoted on the shrub rod or cross brace, frees the engine from the need of adapting any clutching or driving arrangements thereto, other than its pulley, so that different makes of engines can be mounted upon the same model of lawnmower without the necessity for any substantial alterations in the mower.

Another object is to provide a power lawnmower driving mechanism of the foregoing character which is adapted to utilize an improved spring handle support which facilitates the use of the lawnmower and decreases fatigue on the part of the operator.

In the drawings:

Figure 1 is a side elevation of a power lawnmower equipped with the improved driving mechanism, according to one form of the invention;

Figure 2 is a top plan view of the major portion of the power lawnmower shown in Figure 1, with a portion of the handle, control rod and handle support omitted; and Figure 3 is an enlarged inclined section taken along the zigzag line 3—3 in Figure 1, showing the power transmitting mechanism.

Small power lawnmowers have hitherto been driven by a belt running from the engine pulley to a countershaft pulley from which one or more sprocket chains run to the cutting reel or rotary cutter of the lawnmower. In order to make or break the driving connection between the engine pulley and the countershaft pulley, it has been customary to employ an idler pulley which is brought into and out of engagement with the belt in order to tighten or loosen the belt and thus make or break the driving connection, as desired.

It has also been customary in such lawnmowers to mount a control lever upon the handle by which the lawnmower is guided, the control lever being connected by a control rod to the idler pulley by which the belt is tightened or loosened. In prior mowers, however, the idler pulley for tightening the belt has frequenly been mounted upon the engine or upon other parts of the frame remote from the pivotal mounting of the lawnmower handle. As a result, it has usually been necessary to make alterations in the engine or attach different parts thereto before the engine can be mounted upon the lawnmower chassis. Inasmuch as power lawnmower manufacturers are not always able to obtain all of the engines from a single source, this has frequently resulted in inability to accommodate different makes of engines to the same power lawnmower chassis without expensive alterations. Moreover, in such prior lawnmowers, it has frequently occurred that as the handle is raised or lowered while the lawnmower is being guided over the lawn, the relative motion between the handle and the part of the engine or chassis upon which the idler pulley support is mounted causes the latter to be shifted, resulting in a tightening or loosening of the idler pulley relatively to the driving belt. Since mowing an undulating surface, such as a lawn with bankings or a golf course, necessitates raising and lowering the handle during mowing, this interruption or alteration of the driving engagement between the engine pulley and the countershaft pulley has been an annoyance which has interfered with the efficiency of the mower.

The present invention provides a power driving mechanism which eliminates these defects of prior power lawnmowers by pivoting the idler pulley arm and the lawnmower handle on substantially the same cross member of the lawnmower chassis, so that both have substantially the same pivot axis. Thus, the handle may be raised and lowered without materially altering the adjustment of the idler pulley supporting arm upon the cross brace or shrub rod of the lawnmower chassis, no parts need to be added to the engine as it comes from the manufacturer, so that engines of different manufacturers may be mounted at once upon the lawnmower chassis without the expenditure of any preliminary labor in preparing the engine for mounting. Moreover, this construction enables the additional use of a spring-mounted handle support which relieves the fatigue of the operator by enabling the handle to be held with a cushioned grip in an intermediate position from which it may be moved in either direction by shifting the handle upward or downward against the urge of opposing springs. Finally, the present invention enables the idler pulley to to be applied against the inner side of the belt, rather than against the outer side, as in prior belt tighteners, thereby increasing the life of the belt by eliminating the reverse bending of the belt which occurs when the pulley is placed on the outside.

Referring to the drawings in detail, Figures 1 and 2 show a power lawnmower, generally designated 10, according to one form of the invention, as consisting of a chassis, generally designated 11, upon which is mounted an engine, generally designated 12, which transmits its power through driving mechanism, generally designated 13, to the chassis 11. The chassis 11 in turn consists of a frame structure 14 including the usual side plates or side frames 15 interconnected by the cross members or shrub rods 16 and 17, the latter being connected to the side frames 15 by the members or fixed arms 18. The side frames 15 are provided with bosses 19 which are drilled to receive the bolts 20 by which the ground wheels 21 are retained in position against the side frames 15. The ground wheels 21 may optionally be, and usually are, equipped with natural or synthetic rubber tires 22 by which ground shocks are cushioned. The cross rod 16 is mounted at its opposite ends (Figure 2) in suitably drilled bosses 23 in the side frames 15. The latter have downwardly extending brackets or projecting portions 26 which support the fixed cutter bar 27 and also the brackets 28 which support the axles 29 of the ground roller 30. The projecting portions 26 (Figure 1) are drilled as at 31 to receive bolts 32 by which the ground roller brackets 28 are adjusted as to height.

Journaled in the side frames 15 is the shaft 35 (Figure 1) of the usual cutting reel or rotary cutter, generally designated 36. This consists of a pair of two or more spiders 37 which on their peripheries carry the usual spiral cutting blades 38. Mounted on the cutting reel shaft 35 is a sprocket 39 which engages a sprocket chain 40 by which it is driven from a drive sprocket 41. The drive sprocket 41 is mounted on the elongated hub 42 of a pulley 43 and, for purposes of simplicity, the sprocket 41 and pulley 43 are shown as integral with the hub 42 (Figure 3), the assembly of these being generally designated as the rotary driving element 44. The rotary driving element 44 is bored as at 45 to receive the cross rod or shrub rod 17, the opposite ends of which are provided with reduced diameter threaded portions 46 which pass through bores 47 in the fixed arms 18 and are held in position by nuts 48 threaded thereon. A collar 50 is secured as by the pin 51 (Figure 3) to the cross rod or shrub rod 17 in a location spaced away from the inner end of the driving assembly 44, and in the space between these is mounted the hub 52 of the swinging clutching or idler pulley arm 53 which is bored as at 54 for this purpose. The arm 53 on its outer end is provided with a boss 55 which is bored as at 56 (Figure 2) to receive an axle 57 upon which an idler or belt-tightening pulley 58 is rotatably mounted. The outer end of the axle 57 is threaded to receive a retaining nut 60.

The inner end of the axle 57 is also threaded to receive a retaining nut or collar 61 and at this point is bent at right angles, as at 62, and again as at 63 parallel to its original direction (Figure 2), to form a U-shaped member, generally designated 64 which includes the axle 57 and the portions 62 and 63. The parallel portion 63 prevents excessive humping or flapping of the driving belt 65 and retains it in position. The driving belt 65 is preferably a V-belt (Figure 3) and drivingly interconnects the V-groove pulleys 43 and 66. The pulley 66 which is the driving or motor pulley, is mounted upon the engine output shaft 67 which is usually the engine crankshaft or the output shaft of reduction gearing connected to the engine crankshaft. The engine 12 is of conventional design and its details form no part of the present invention. A belt guide 70 (Figure 1) of roughly V-shaped form is mounted adjacent one side of the driving belt 65 and is secured at its lower end to the apron 71 of the chassis 11. The apron 71 is in the form of a sheet metal plate which is bent over and interconnects the cross rods or shrub rods 16 and 17 (Figure 2) and is cut away as at 72 and 73 for the passage of the belt 65 and for accommodating the pulley 43.

The idler or belt tightener pulley arm 53 is drilled as at 74 intermediate the hub 52 and the boss 55 to receive a pivot stud or bolt 75 upon which is mounted the suitably drilled collar or connection 76 into which the lower end of the control rod 77 is threaded or otherwise secured. A nut 78 (Figure 3) on the stud 75 holds these parts in assembly. A turnbuckle 79 provides an adjustment for varying the length of the control rod 77.

The control rod 77 proceeds upward and at its upper end is pivoted as at 80 to one arm 81 of a bell crank lever or operating lever 82, the opposite arm 83 of which is provided with a hand knob 84. The bell crank lever or control lever 82 is pivotally mounted as at 85 on a collar 86 which is secured to the shaft 87 of the lawnmower handle, generally designated 88, and which carries a stop pin 86a. The handle has a cross bar 89 (Figure 1) at its upper end and is provided with lower yoke portions or arms 90, the ends of which are flattened and drilled as at 91 to receive the reduced diameter portions 46 of the cross rod or shrub rod 17, and are held in position thereon by the nuts 48. The handle 88 is preferably of tubular metallic construction for lightness and strength.

The handle 88 is optionally provided with a resilient support, generally designated 92, consisting of a rod 93 which is bent and threaded as at 94 to be inserted through a hole 95 in the handle 88 and held in position by nuts 96. The opposite end of the rod 93 is provided with spaced abutments 97 and 98 for helical compression springs 99 and 100 disposed on opposite sides of an upstanding bracket 101 of inverted U-shaped form which is bolted or otherwsie suitably secured as at 102 to the top or cylinder head 103 of the engine 12. The abutments 97 and 98 may consist of nuts and washers, the rod 93 being suitably threaded to receive them.

For purposes of simplicity, the power lawnmower 10 has been shown as having the power driving arrangement arranged merely to rotate the cutting reel 36.

In the operation of the invention, the engine 12 is started in operation and transmits its power from the pulley 66 to the pulley 43 by way of the driving belt 65, assuming that the idler pulley of belt-tightening pulley 58 is in its tightened position, as shown in Figure 1. The consequent rotation of the rotary driving element 44 (Figure 3) of the power transmitting mechanism 13 transmits this power at a speed reduction, from the sprocket 41 through the sprocket chain 40 to the cutting reel sprocket 39, rotating the cutting reel shaft 35 and the cutting reel 36. Consequently, as the lawnmower is pushed over the lawn to be mowed, the cooperation between the blades 38 of the rotary cutting reel 36 and the fixed cutter bar 27 causes the grass to be cut in the usual way.

If the lawn or other surface to be mowed is undulating, the chassis 11 will move up and down and at the same time rock relatively to the handle 88, which pivots around the shrub rod 17. Since the idler pulley or belt tightening arm 53 is likewise pivotally mounted upon the shrub rod 17 and therefore swings to and fro upon the same pivot axis, and since the control rod 77 is disposed close to the handle 88, the rise and fall of the handle 88 and chassis 11 relatively to one another has no material effect upon the tightness of the idler pulley 58. As a consequence, there is no interference in the driving mechanism 13 by the undulating nature of the lawn being mowed, as in prior power lawnmowers.

While the mower is performing its mowing operations, the support 92 assists in carrying the weight of the handle 88 and its double oppositely-acting springs 99 and 100 give a cushioning effect which permits a limited swinging of the handle 88 relatively to the chassis 11 and vice versa. This swinging is facilitated by the mounting of the idler pulley or belt tightening arm 53 upon the same pivotal axis as the handle 88 since the latter can be swung through a much wider angle than ordinary handles without interfering with the driving mechanism 13.

To interrupt the drive at any desired location, the operator merely swings the handle knob 84 on the end of the bell crank lever 82 to push the control rod 77 downward. Preferably, the bell crank lever 82 is arranged so that it accomplishes a toggle action so that the arm 83 thereof is swung upward to swing the arm 81 and the rod 77 over dead center on the pin or pivot 85 before moving the control rod 77 in a downward direction to relax the grip or engagement of the idler pulley 58 against the belt 65. When this is done, the belt 65 becomes slack and loose, and no longer transmits power to the pulley 43. The belt guides 70 and 63 prevent undue or excessive humping or flapping of the belt 65 and maintain it in a position of constant readiness to be engaged by the idler pulley or belt tightening pulley 58.

What I claim is:

In a power lawnmower, a chassis, an engine mounted on said chassis and having an output shaft, a driven shaft, a belt drivingly connecting said shafts, an arm swingably mounted at one end for swinging about the axis of said driven shaft, an idler wheel journaled on the other end of said arm and disposed such that said wheel is adapted to engage said belt for the purpose of tightening same, a handle structure pivotally mounted on said chassis on an axis coaxial with the axis of said driven shaft, an operating lever mounted on said handle structure, means connecting said lever and said arm operable to swing said arm about its mounting axis thereby to tighten or loosen said belt, said arm, handle and lever being constructed and arranged such that swinging of said handle about its mounting axis imparts negligible movement to said arm.

References Cited in the file of this patent

UNITED STATES PATENTS

| Number | Name | Date |
|---|---|---|
| 1,858,618 | Carlson | May 17, 1932 |
| 1,899,305 | Bley | Feb. 28, 1933 |
| 2,214,501 | Kinkead | Sept. 10, 1940 |
| 2,247,333 | Funk | June 24, 1941 |
| 2,484,795 | Schofield | Oct. 11, 1949 |
| 2,509,993 | Soss | May 30, 1950 |
| 2,519,039 | George et al. | Aug. 15, 1950 |